Figure 1:
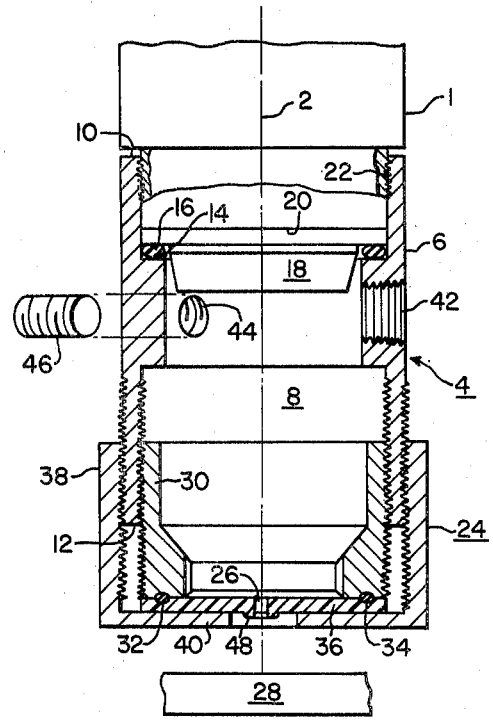

United States Patent
Van Der Jagt

[15] 3,685,882
[45] Aug. 22, 1972

[54] SELF-ALIGNED GAS ASSISTED LENS FOR LASER BEAM APPARATUS

[72] Inventor: Anton Van Der Jagt, Mount Airy, Md.

[73] Assignee: Westinghouse Electric Corporation, Pittsburgh, Pa.

[22] Filed: Nov. 2, 1970

[21] Appl. No.: 86,212

[52] U.S. Cl..............350/63, 219/121 LM, 331/94.5
[51] Int. Cl. .....................................................G02b
[58] Field of Search ..350/63; 219/121 LM; 331/94.5

[56] References Cited

UNITED STATES PATENTS

| | | | |
|---|---|---|---|
| 3,569,660 | 3/1971 | Houldcroft | 350/63 UX |
| 3,310,356 | 3/1967 | Borberg | 350/63 |
| 3,594,261 | 7/1971 | Broerman | 219/121 LM |

*Primary Examiner*—David Schonberg
*Assistant Examiner*—Toby H. Kusmer
*Attorney*—A. T. Stratton, C. L. Freedman and John L. Stoughton

[57] ABSTRACT

A self-aligned gas assisted lens for a laser beam apparatus wherein the orifice through the sheet aperture is formed by the laser beam and consequently is in exact alignment with the laser beam and of a minimum cross-sectional area.

11 Claims, 2 Drawing Figures

PATENTED AUG 22 1972

3,685,882

WITNESSES
Theodore T. Arobel
James T. Young

INVENTOR
Anton van der Jagt
BY
John L. Stoughton
ATTORNEY

SELF-ALIGNED GAS ASSISTED LENS FOR LASER BEAM APPARATUS

BRIEF SUMMARY OF THE INVENTION

It is common practice in the industry to combine a gas laser, as for example a $CO_2$ laser, with a so-called gas assisted lens wherein a jet of gas flows along the path of the laser beam towards the workpiece and impinges thereon to assist the operation (cutting, drilling, etc.) performed by the laser beam.

The gas assisted lens presently used in the industry generally includes a water cooled lens holder, a lens, a gas jet holder and a metal cone with an orifice. The gas jet holder and cone have predetermined dimensions which have to be changed for different lenses and different workpiece-lens distances.

The most important disadvantage of this system is that it requires a nearly perfect alignment of the laser beam with the orifice. The diameter of the orifice has to be made such that the laser beam will not strike the metal of the orifice edge because when this happens the laser beam will partially reflect back to the lens with a very probable chance that due to the extra heat, the lens may be destroyed. At the same time, the orifice diameter must be as small as possible to provide maximum velocity of gas at a minimum gas pressure in order to reduce the total volume of used gas.

Although it is possible to obtain a good alignment, the procedure of aligning is a very tedious and difficult job. Besides, for every lens-workpiece configuration the exact diameter of the laser beam at the orifice has to be known and this is difficult to measure.

IN accordance with this invention, the electron beam itself is used to form the orifice through which the laser beam and gas jet eventually passes to the workpiece. With the orifice so formed, it is in perfect alignment with the laser beam and is of a minimum cross-sectional area.

Figure 2:
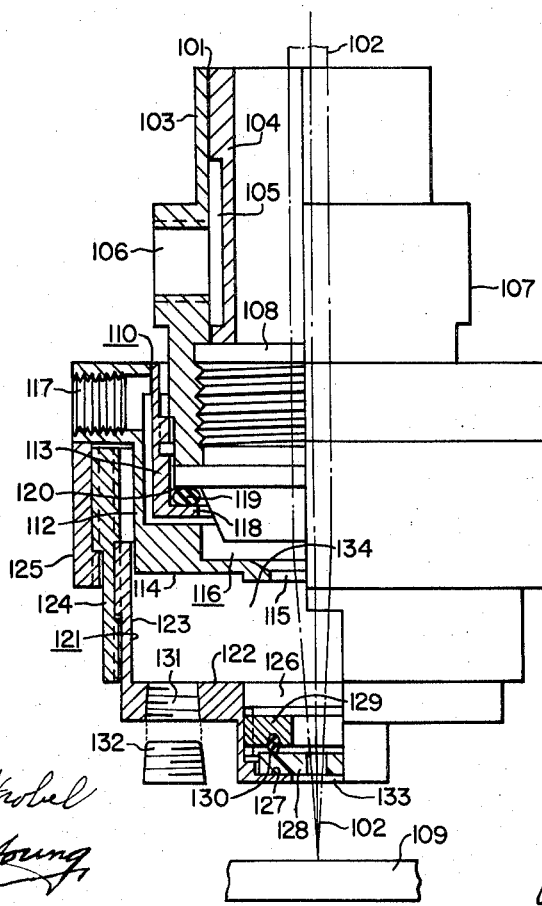

For a better understanding of the invention, reference may be had to the preferred embodiment, exemplary of the invention, shown in the accompanying drawing, in which:

FIG. 1 is a view in central cross section of a gas assisted lens provided with a disposable orifice holder embodying the invention; and FIG. 2 is a view in partial section of a modified form of a gas assisted lens with a disposable orifice holder embodying the invention.

Referring to the drawings by character of reference and more particularly FIG. 1, the numeral 1 designates generally a water cooled lens holder associated with a laser beam generating apparatus which provides a laser beam 2. A gas assisted lens device 4 comprises a hollow cylindrical member 6 having a hollow interior 8 opening upwardly through a first end wall 10 and downwardly through a second end wall 12. An upwardly facing shoulder 14 is provided within the member 6 adjacent the first end wall 10 and faces outwardly therethrough. A sealing member such as an O-ring seats against the shoulder 14. Seated thereagainst is the outer peripheral edge of a lens 18. The lens 18 is suitably held in fluid tight engagement against the O-ring 16 by means of the downwardly facing peripheral shoulder 20 of the member 1. For this purpose the lower end of the member 1 and the upper end of the member 4 may be suitably threaded as illustrated by the screw thread connection 22.

The lower or second end wall 12 is closed by the closing means 24 except for the aperture 26 through which the electron beam 2 moves outwardly from the hollow interior 8 to impinge upon a workpiece 28. The closing means 24 comprises an annular member 30 having external screw threads cooperating with internal screw threads of the member 6 adjacent the second end wall 12. The annular member 30 is provided with an annular groove 32 which receives an 0-ring 34. A sheet member or disk 36, which may be of one of the acrylic plastics or could also be of other suitable metallic material is non-reflective or only slightly reflective to the wavelengths of the laser used. The 0-ring is held against the member 36 by an internally screw threaded collar 38 which is screw threaded on the external screw threads of the member 6. The member 36 seats against an annular shoulder 40 which extends inwardly from the lower surface of the apertured member 36.

The side wall of the hollow cylindrical member 6 adjacent the first end portion 10, but below the shoulder 14, is provided with an inlet port 42 which is adapted to be connected by suitable means (not shown) to a suitable source of gaseous fluid (not shown). The hollow cylindrical member 6, further, is provided with a pair of outlet ports 44 (one only of which is shown in the drawing) which ports 42 and 44 are separated around the periphery of the cylindrical member 6 by an angle of 120°. The outlet ports 44 are each provided with a closure plug 46 whereby they may be opened during at least the initial formation of the aperture 26 to provide for the passage of fluid through a first path extending from the inlet port 42 to the outlet ports 44 substantially transversely to the lower surface of the lens 18 to sweep the material removed from the sheet member 36 out of the member 6 and away from the lens 18. Thereafter the plugs 46 are inserted to direct the flow of gas assisting fluid through a second path which extends from the inlet port 42 downwardly through the aperture 26 and along the longitudinal axis of the laser beam 2 against the workpiece 28.

It is believed that the remainder of the description may best be provided by a description of operation of the invention which is as follows. When it is desired to prepare the gas assisted lens, the hollow cylindrical member 6 is screw threaded to the lower end of the water cooled lens holder 1 with the lower end surface thereof holding the lens 18 against the O-ring 16 in sealing relationship with the shoulder 14. The sheet member 36 which then is imperforate and does not include its aperture 26 is placed against the O-ring 34 and held thereto in fluid tight relation by means of the collar 38. Suitable fluid from a source of fluid supply under a suitable pressure is supplied through the inlet port 42. This fluid flows through the first passageway and outwardly through the outlet ports 44 (which at this time are open since the closure plugs 46 have been removed). The laser apparatus is then energized to provide its laser beam 2 which impinges upon the sheet member 36 and forms a small aperture through the sheet member 36 aligned with the beam 2. The material, generally in the form of a vapor, which results from the forming of the initial hole through the member 36 rises upwardly in the hollow interior of the member 8 aNd is swept outwardly of the ports 44 through the first passageway and the material is thereby prevented from striking the lower surface of the lens 18. Subsequent to this step, the generation of the laser beam 2 is terminated and the plugs 46 are placed in the outlet ports 44 to prevent further flow of gas through the first passageway and to direct the fluid flow from the inlet port 42 to pass downwardly and outwardly through the partially fabricated orifice 26 in the sheet member 36. Thereafter the laser apparatus is energized and the continued provision of the laser beam 2 enlarges the hole through the sheet member 36 to provide the full size orifice 26. The material removed from the orifice 26 during this latter step will build-up a rim 48 around the aperture on the outside surface of the member 36.

It will now be seen that with this arrangement the laser beam 2 provides its own aperture 26 which is in precise alignment with the beam 2 and which is a minimum cross-sectional area so that the maximum gas velocity with a minimum gas pressure will be provided a minimum total volume of gas for operating on the workpiece 28. It will further be appreciated that by utilizing the first passageway for sweeping the material formed during the initial formation of the aperture 26, the lens 18 is protected from being injured or destroyed by the material removed from the sheet metal 36.

Referring to FIG. 2 the numeral 101 designates generally a hollow water cooled member or envelope adapted to be associated with a laser beam generating apparatus which provides the laser beam 102. The envelope 101 comprises an outer substantially cylindrical member 103 and an inner substantially cylindrical member 104 which are brazed together as shown to form an annular chamber 105. The chamber 105 is provided with an inlet 106 and an outlet 107 for flow of cooling fluid through the chamber 105. An internally threaded lower end portion of the envelope 101 is internally threaded for reception of the externally threaded lens holder 108 which carries a lens (not shown) by which the beam 102 is focused on the workpiece 109.

The lower end portion of the envelope 101 is externally threaded for reception of the internally threaded upper end portion of a gas jet holder 110. The holder 110 includes an outer stepped hollow generally cylindrical member 112 and an inner generally cylindrical member 113 brazed together at their upper end portions. The lower end of the member 112 is closed by a lower end wall 114 having a central aperture 115 therethrough through which the beam 102 passes. The inner member 113 at its lower end portion is of lesser outer diameter than the inner diameter of the adjacent outer member 112 and terminates above the wall 114 to provide an annular chamber 116 by which fluid supplied thereto through the inlet 117 passes through the aperture 115 axially of the beam 102. Preferably the fluid is in the form of a gas such as air, nitrogen, oxygen, etc. but could be of a liquid which is non-absorptive at the laser. As illustrated, the lower end of the member 113 is provided with an inwardly extending radial flange 118 which compresses an 0-ring 119 against the annular lower end wall 120 of the lens holder 108 to prevent the escape of fluid upwardly between the envelope 101 and the holder 110.

A cylindrical end holder 121 is carried by the gas jet holder 110 outwardly of the end wall 114. The end holder 121 comprises an upwardly opening cup-shaped member having a lower end wall 122 and an externally threaded cylindrical side wall 123 which is in screw threaded engagement with the internal threads of a hollow cylindrical member 124, the external threads of which are in threaded engagement with the internal threads of a downwardly opening collar 125. The upper end of the collar 125 is suitably secured, as by brazing, to the downwardly facing annular shoulder of the stepped member 112. This threaded arrangement of the parts permits the adjustment of the end wall 122 relative to the end wall 114.

The lower end wall 122 is provided with a central aperture 126 concentric with the beam 102. The aperture 126 is provided with an upwardly facing shoulder 127. A disc 128 initially imperforate is held against the shoulder 127 by a ring 129 screw threadedly received in the wall of the aperture 126. The disk 128 is of a material similar to that of disk 36.

An O-ring 130 positioned between the disk 128 and ring 129 prevents the escape of fluid therebetween. The end wall 122 is provided with at least one internally threaded venting aperture 131. Each aperture 131 is closed by screw threaded plug 132 subsequent to the forming of the aperture 133 by the impingement of the beam 102 on the disk 128.

The apparatus of FIG. 2, in use, has its coolant inlet 106 of coolant, to a suitable source of coolant which maybe water, and its coolant outlet 107 connect to a suitable drainage system whereby coolant flows through the chamber 105.

A source of suitable laser-assist fluid, which fluid normally is a gas, is connected to the fluid inlet 117. Initially the disk 128 is imperforate and the plugs 132 are removed whereby fluid flows from the inlet 117 through the annular chamber 116 downwardly through the aperture 115 into a chamber 134 formed between the end walls 114 and 122. The fluid during at least the initial formation of the aperture thereafter flows outwardly of the chamber 134 through the now open apertures 131. The apertures 115 and 131 are sized with respect to the flow of the fluid through the chambers 116 and 134 so that the pressure in chamber 116 is somewhat greater than that in the chamber 134.

Thereafter the laser beam 102 is established and this beam will form a hole through the disk 128. The removed material will be blown outwardly of the chamber 134 through the apertures 131 and will be prevented from passing upwardly through the aperture 115 by the downwardly flowing gas and the somewhat higher pressure in the chamber 116. Subsequently to the formation of the initial hole, the plugs 132 are inserted in the apertures 131 and thereafter the fluid passes outwardly of the chamber 134 through the aperture 133 and impinges on the workpiece 109.

What is claimed and is desired to be secured by United States Letters Patent is as follows:

1. A gas assisted lens comprising a hollow member having a peripheral wall defining a hollow interior having a beam path which extends between first and second end walls thereof, said first end wall including means for attachment of said member to a laser generating apparatus whereby a laser beam may be projected along said path of said member, a sheet of non-reflecting material, means securing said material to said member adjacent said second end wall and transversely of said beam path, said peripheral wall including at least a pair of apertures defining an inlet and outlet of a fluid flow path extending generally transversely to said path, a first of said apertures being adapted to be connected to a source of fluid for flow of fluid into said fluid path within said hollow interior, a second of said apertures being peripherally spaced from said first aperture whereby said fluid path provides for flow of fluid across said hollow interior and transversely of said beam path, and means for selectively terminating fluid flow through said second aperture outwardly of said hollow interior.

2. The combination of claim 1 in which said sheet of material is a sheet of non-metallic material.

3. The combination of claim 1 in which said material is an acrylic sheet.

4. The combination of claim 2 in which said hollow member is a hollow cylinder, said peripheral wall is provided with a third aperture, said apertures are spaced at equal angles around the periphery of said peripheral wall, and said third aperture is provided with means selectively terminating fluid flow therethrough.

5. The combination of claim 2 including, a lens, means sealing said lens to said first wall and thereby closing the opening of said hollow interior through said first wall, a laser beam generating apparatus providing a laser beam which passes through said lens and along said beam path said wheel material having an aperture therethrough aligned with said beam path and through which the laser beam passes, said aperture being substantially no larger in area then the area of said laser beam at said aperture through said sheet material, said sheet material having an integrally formed rim about the periphery of said aperture on the surface thereof away from said hollow interior.

6. In combination a laser beam generating apparatus having an end wall through which the laser beam generated thereby passes outwardly therefrom, a hollow cylindrical member having a hollow interior opening outwardly through first and second end walls, a shoulder within said interior adjacent to and facing outwardly of said first end wall, a sealing member seating on said shoulder, a lens seating on said sealing member and adapted to be maintained thereagainst by said end wall of said apparatus to seal the opening of said interior through said first end wall, said lens being effective to permit the transmission of said laser beam from said apparatus through said interior and outwardly through said second end wall, closing means for restricting the opening of said interior through said second end wall, said closing means including a non-metallic sheet member extending substantially transversely of said hollow member, said sheet member being provided with an aperture extending therethrough in exact alignment with said beam, said aperture being formed by the bombardment of said laser beam against said sheet member, said hollow member being provided with gaseous fluid inlet and outlet means into and out of said hollow interior intermediate said end walls to provide a first fluid flow path extending substantially transversely to the plane of said lens to sweep outwardly of said interior material removed by the bombardment of said beam against said sheet member during the forming of said aperture, and means to terminate flow through said first path whereby fluid admitted through said inlet means flows in a second path outwardly of said interior through said formed aperture.

7. The combination of claim 6 in which said sheet member is provided with a rim formed by material removed from the walls of said aperture as a consequence of the passage of said laser beam through said sheet member and the flow of fluid through said second path.

8. A gas assisted lens comprising a first body member having an opening therethrough through which a laser beam may be projected, an optical lens associated with said body member and through which said laser beam passes, a second body member positioned on the outlet side of said optical lens and cooperable therewith to provide a passageway therebetween, said passageway having a first portion through which said laser beam passes, a third body member carried by said second member and cooperable therewith to provide a chamber into which fluid flowing through said passageway discharges, said third body member being provided with a first aperture aligned with and through which said laser beam passes for engagement with a workpiece, said third body member being provided with a second aperture, and means closing said second aperture during intervals in which said laser beam is being used to perform work on said workpiece.

9. The combination of claim 8 in which said passageway has a second portion for flow of fluid therethrough in a direction substantially transversely to the surface of said optical lens, said flow of fluid being in a direction from said second passageway portion to said first passageway portion and said first passageway portion being of reduced cross sectional area relative to said second passageway portions whereby the pressure of the fluid flowing in said second passageway portion is at a higher pressure than that of the fluid flowing in said first passageway portion.

10. The combination of claim 9 in which the portion of said third body member containing its said first aperture is of a non-metallic material, said material being removable from the remainder of said third body member, the cross sectional area of said second aperture of said third body member being substantially greater than the cross sectional area of its said first aperture.

11. The combination of claim 10 in which said third body member's first aperture is adjustably positioned longitudinally along said laser beam relative to said optical lens.

* * * * *